(12) United States Patent
Schmid et al.

(10) Patent No.: US 10,544,697 B2
(45) Date of Patent: Jan. 28, 2020

(54) SEAL ARRANGEMENT FOR A TURBOMACHINE AND PROCESS FOR THE PRODUCTION THEREOF

(71) Applicant: MTU Aero Engines AG, Munich (DE)

(72) Inventors: Siegfried Schmid, Geralsbach (DE); Michael Schober, Munich (DE); Siegfried Sikorski, Munich (DE); Axel Mattschas, Starnberg (DE); Robert Bader, Zolling (DE)

(73) Assignee: MTU AERO ENGINES AG, Munich (DE)

( * ) Notice: Subject to any disclaimer, the term of this patent is extended or adjusted under 35 U.S.C. 154(b) by 1428 days.

(21) Appl. No.: 14/490,931

(22) Filed: Sep. 19, 2014

(65) Prior Publication Data

US 2015/0078893 A1 Mar. 19, 2015

(30) Foreign Application Priority Data

Sep. 19, 2013 (EP) .................................... 13185071

(51) Int. Cl.
  *F01D 11/02* (2006.01)
  *F16J 15/447* (2006.01)
  (Continued)

(52) U.S. Cl.
  CPC .............. *F01D 11/02* (2013.01); *B29C 65/02* (2013.01); *B29C 65/70* (2013.01); *F16J 15/447* (2013.01); *F05D 2220/32* (2013.01); *F05D 2230/21* (2013.01); *F05D 2230/40* (2013.01); *F05D 2240/58* (2013.01); *F05D 2300/434* (2013.01); *F05D 2300/437* (2013.01); *F05D 2300/44* (2013.01)

(58) Field of Classification Search
  CPC ........ F01D 11/02; F01D 11/122; F01D 11/08; B29C 65/02; B29C 65/70; F16J 15/447
  See application file for complete search history.

(56) References Cited

U.S. PATENT DOCUMENTS 2,962,809 A     12/1960 Short et al.
2008/0026142 A1*  1/2008 Vontell ..................... C09J 5/06
                                                        427/207.1
(Continued)

FOREIGN PATENT DOCUMENTS

DE     102008019890 A1    10/2009
EP         1992823 A1    11/2008

*Primary Examiner* — Ninh H. Nguyen
*Assistant Examiner* — Maxime M Adjagbe
(74) *Attorney, Agent, or Firm* — Abel Schillinger, LLP

(57) ABSTRACT

The present invention relates to a process for producing a seal arrangement (1) for a turbomachine which comprises a seal support (2) and a stripping lining (3) which is arranged on the seal support, wherein the seal support comprises a fiber-reinforced plastic and the stripping lining comprises polysiloxane, and wherein the seal support and the stripping lining are prepared in a non-cured state and are arranged in direct contact with one another in accordance with the configuration of the seal arrangement, and are subsequently subjected to a common curing process such that fiber-reinforced plastic and polysiloxane cross-link with one another. The present invention further relates to a correspondingly produced seal arrangement and to a turbomachine having such a seal arrangement.

20 Claims, 2 Drawing Sheets

(51) Int. Cl.
    *B29C 65/02*    (2006.01)
    *B29C 65/70*    (2006.01)

(56) References Cited

U.S. PATENT DOCUMENTS

2008/0284109 A1    11/2008  Northfield
2010/0196147 A1*    8/2010  Schilling .................. F01D 5/28
                                                     415/173.1
2012/0094777 A1*    4/2012  Hechler-Stabbert .... F02C 7/275
                                                     464/183

* cited by examiner

SEAL ARRANGEMENT FOR A TURBOMACHINE AND PROCESS FOR THE PRODUCTION THEREOF

BACKGROUND OF THE INVENTION

Field of the Invention

The present invention relates to a seal arrangement for a turbomachine, in particular a static gas turbine or an aircraft engine, and to a process for the production thereof.

Discussion of Background Information

In simple terms, in turbomachines such as static gas turbines or aircraft engines, a rotor rotates about an axis with respect to a stationary stator. The stator has guide vanes which direct the gas flow flowing through the turbomachine onto the rotating rotor blades of the rotor.

In order to achieve a high efficiency for the turbomachine, the gaps between the rotor and the stator, at the radially inward ends of the guide vanes on one side and the rotor on the other side, and at the radially outward ends of the rotor blades on one side and the stator on the other side, must be kept as small as possible in order to avoid flow losses. Accordingly, seal arrangements are known for this purpose, which are termed Inner Air Seals or Outer Air Seals depending on whether they are arranged at the inward ends of the guide vanes or at the radially outward ends of the rotor blades.

DE 10 2008 019 890 A1 discloses a seal arrangement in the form of an inner ring for a guide vane ring, which is arranged radially inwardly and is formed from a seal support and a stripping lining, wherein the stripping lining serves for example to cooperate with sealing fins of the rotor so as to create a gap seal. In this context, the sealing fins cut into the stripping lining of the seal arrangement. In the seal arrangement of DE 10 2008 019 890 A1, both the seal support and the stripping lining are formed from fiber-reinforced plastic materials.

Although the above document has already disclosed a seal arrangement which is simple to produce on account of the seal support material and the material for the stripping lining being produced in the same manner, there remains a need for seal arrangements which have different materials for the seal support and the stripping lining so as to better satisfy the various demands on the seal support and the stripping lining, and which should at the same time be simple to produce.

Thus, for example, DE 10 2008 019 890 A1 describes that an advantageous seal support could be made from fiber-reinforced plastic while the stripping lining could be made from a silicone material (polysiloxane material). However, this combination of materials is disadvantageous since the only possibility for connecting these materials by adhesively bonding the stripping lining onto the seal support is very laborious and problems may arise with respect to ensuring the prescribed service life.

DISCLOSURE OF THE INVENTION

Object of the Invention

It is therefore an object of the present invention to provide a seal arrangement for a turbomachine and a process for producing a seal arrangement, wherein the seal arrangement has a material selection which is optimized for the requirements, in particular different materials for the seal support and the stripping lining, and at the same time the production method is simple to carry out.

Technical Solution

This object is achieved by a process for producing a seal arrangement, a seal arrangement, and a turbomachine as set forth in the instant independent claims. Advantageous embodiments are the subject-matter of the dependent claims.

The present invention proposes, in order to achieve the abovementioned object, to provide a seal arrangement in which the seal support is formed from a fiber-reinforced plastic and the stripping lining is formed from a polysiloxane material, wherein the stripping lining made from polysiloxane is arranged on the seal support made from the fiber-reinforced plastic such that both the seal support and the stripping lining are arranged with respect to one another as desired in a non-cured state and are then subjected to a common curing process, such that the fiber-reinforced plastic and the polysiloxane cross-link chemically with one other during the curing. By so doing, a reliable and durable connection between the seal support and the stripping lining can be produced simply and without the use of additional binding agents such as adhesives or the like, wherein the production process can be made substantially simpler with respect to the prior art.

In particular, in such a production method, the shaping of the seal support and/or of the stripping lining can be connected with the cross-linking with the respective other component, such that a multiplicity of laborious production steps can be avoided and, preferably, the shaping and connecting of the seal support and the stripping lining can be achieved in a single step.

The fiber-reinforced plastic may comprise fibers in the form of carbon fibers, glass fibers, aramid fibers, polyester fibers, polyvinyl acetate fibers, polypropylene fibers and/or polyethylene fibers, and the matrix material of the fiber-reinforced plastic may be a thermoset or a thermoplastic. Of particular preference is a thermoset which, once cured, exhibits no further change of shape when under thermal load. In particular, polyamide resin, phenol resin, vinyl ester and/or epoxy resin may be used as the matrix material for the fiber-reinforced plastic.

Polysiloxanes, which are also termed silicone materials and are provided for the stripping lining, are synthetic polymers in which in the polymer chains silicon atoms are linked via oxygen atoms. In the present invention, various polysiloxane materials having various substituents on the polymer chains and/or additives may be used.

In the production method, both the seal support and the stripping lining may together, in one production step, be shaped and in each case individually and mutually cured and, respectively, chemically cross-linked. However, it is also possible to separately produce either the seal support or the stripping lining or both as non-cured semi-finished products which may then either in each case be used in the shaping process for the other component or be cured with each other after suitable mutual arrangement. In other words, either the seal support or the stripping lining may be produced as a non-cured semi-finished product and then, in the shaping process for the other component, be arranged in a mold such that, during shaping of the corresponding component, cross-linking with the non-cured semi-finished product occurs simultaneously. Alternatively, the seal support and the stripping lining may be produced as non-cured semi-finished products and these may then be cross-linked with one another by means of a common curing process.

The seal support may be produced by transfer molding, pultrusion, resin injection methods or pre-preg methods, in which the fibers of the fiber-reinforced plastic, for example in the form of a woven fabric, e.g. as a tube, or a cross-lay are impregnated or surrounded by a suitable plastic matrix material, wherein the semi-finished product produced in this manner is however not yet cured. According to the invention, the common curing and, respectively, cross-linking then takes place only once the stripping lining, which may also be produced as a molded body in the form of a semi-finished product, has been arranged.

The curing and, respectively, cross-linking may take place at temperatures in the range from 120° C. to 250° C., in particular 180° C. to 230° C.

A corresponding seal arrangement may for example be used for what is termed the Inner Air Seal, wherein the seal arrangement may form at least part of an inner ring of a stator. The seal support may in this case be formed as a ring or part of a ring which has, in cross section transverse to the circumferential direction of the annular structure, a U-shaped basic shape so as to thus define an accommodating space for the radially inward ends of the guide vanes of a guide vane ring. The base of the U-shaped basic shape, which runs along the circumferential direction in the form of a cylindrical enclosure, may accordingly have webs which run radially and in the circumferential direction, are arranged at the axial ends of the base or, respectively, at the end sides of the cylindrical enclosure, and enclose the radially inward end of a guide vane. The stripping lining may be arranged on the full area of the base, specifically over the entire extent of the stripping lining in the circumferential direction and the axial direction, which extends parallel to the ring and/or cylindrical enclosure according to the axis of the annular structure in the center of the annular structure.

The radially oriented webs of the U-shaped basic shape of the seal support may have, at the radial ends facing away from the base, various components such as angle elements having axially and radially oriented sections or axially oriented end strips, such that the axially oriented sections form an annular cavity of rectangular cross section in which are arranged the radially inward ends of the guide vanes of a guide vane ring.

The fibers in the fiber-reinforced plastic of the seal support may be arranged in a targeted manner such that the fibers enclose, relative to the axis of rotation of the turbomachine or, respectively, the axial direction of the annular structure or a direction parallel thereto, an acute angle of 30° to 90°, in particular 45° to 90°, preferably 60° to 90°, such that the principal loads of the annular structure in operation may be taken up by the fibers.

BRIEF DESCRIPTION OF THE DRAWINGS

In the appended purely schematic figures.

EXEMPLARY EMBODIMENTS

Further advantages, characteristics and features of the present invention will become clear in the following detailed description of the exemplary embodiments. However, the invention is not restricted to these exemplary embodiments.

Figure 1:
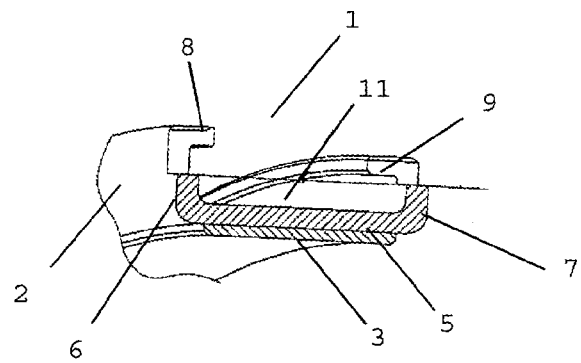
FIG. 1 shows a perspective view in partial section of part of a seal arrangement according to the invention.
Figure 4:
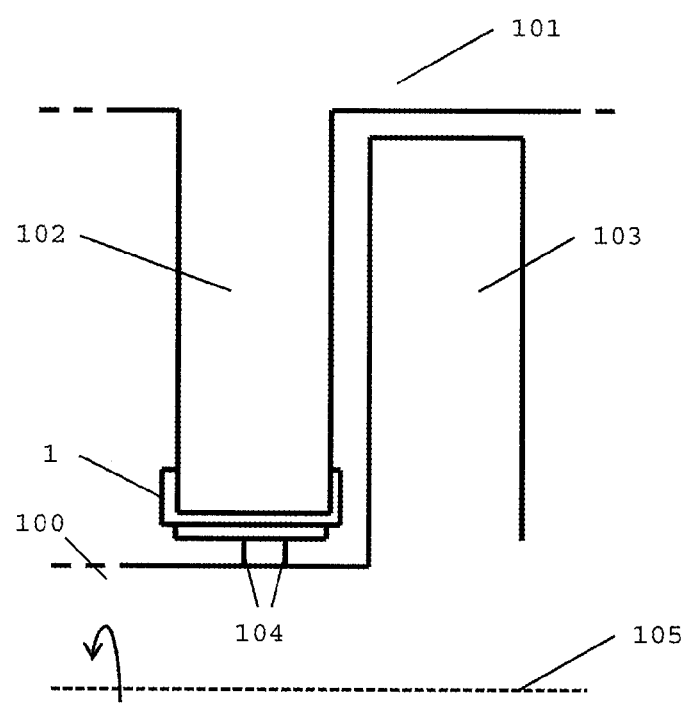
FIG. 4 shows a section from a turbomachine for the purpose of clarifying the arrangement of the seal arrangement in a turbomachine.

FIG. 1 shows, in a perspective and partially sectional representation, part of a seal arrangement 1 according to the invention, in the form of an inner ring for a stator guide vane ring. In the case of a guide vane ring of a stator of a turbomachine, such an inner ring 1 is arranged at the radially inward end of the guide vanes, opposite the shaft, as represented in FIG. 4. There, the shaft 100 of a rotor is shown with a rotor blade 103 which is arranged adjacent to a guide vane 102 of the stator 101, wherein the seal arrangement 1 according to the invention is arranged at the radially inward end of the guide vane 102 and is in engagement with sealing fins 104 of the rotor so as to seal the gap between the shaft 100 and the guide vane 102 and thus avoid flow losses. The axis of rotation 105 of the turbomachine, which corresponds to the axial direction of the seal arrangement and with respect to which the radial direction is also defined, is also shown.

Figure 2:
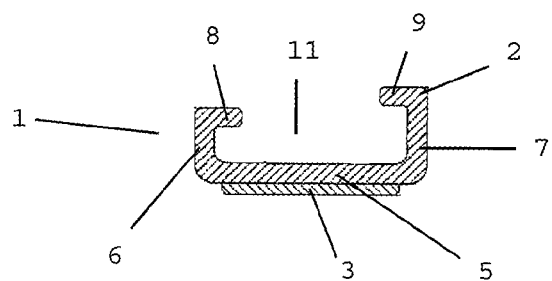
FIG. 2 shows a cross-sectional view of the seal arrangement from FIG. 1.

The seal arrangement 1, as shown in FIGS. 1 and 2, has a seal support 2, which is arranged on the guide vanes 102, and a stripping lining 3 which cooperates with the sealing fins 104 of the shaft 100 of the rotor in such a way that the sealing fins 104, at least in certain operating situations, rub against the stripping lining 3 and cut into the stripping lining 3.

The seal support 2 has a base 5 which extends in the shape of a strip in the axial direction, that is to say in the direction of the axis of rotation or the flow axis of the turbomachine, and in the circumferential direction about the axis of rotation. The stripping lining 3 is arranged on the full area of the base 5. The seal support 2 further comprises, radially and circumferentially about the ring axis of the seal arrangement 1 or the axis of rotation of the turbomachine, webs 6 and 7 on whose radial ends remote from the stripping lining 3 end strips 8, 9 are provided which in turn run in the axial direction and circumferentially about the annular structure such that the base 5, the radially oriented webs 6, 7 and the end strips 8, 9 form an annular cavity 11 of rectangular cross section which accommodates the radially inward end of a guide vane 102.

Figure 3:
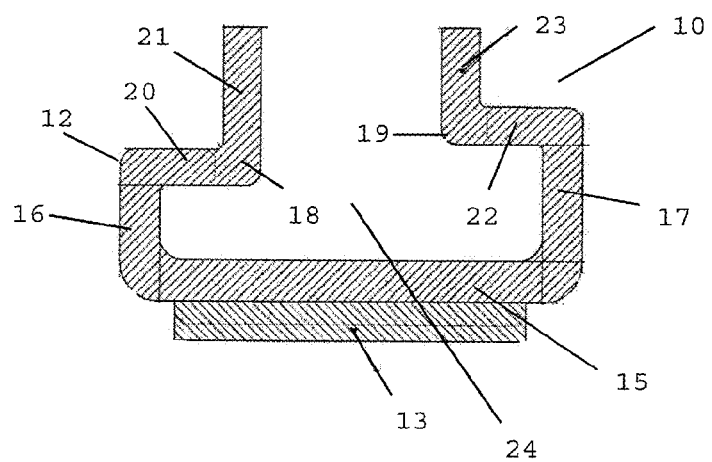
FIG. 3 shows a further cross-sectional view of a further embodiment of a seal arrangement according to the invention.

A further embodiment of a seal arrangement according to the invention, in the form of an inner ring for a stator of a turbomachine, is shown in FIG. 3. The inner ring 10 of the second embodiment of the seal arrangement according to the invention differs from the first embodiment, which is shown in FIGS. 1 and 2, simply in the configuration of the seal support 12. The seal support 12 comprises, just like the seal support 2, a base 15 and radially oriented webs 16 and 17. However, at that end of the webs 16, 17 which faces away from the stripping lining, there are provided not only axially oriented end strips but angle elements 18, 19 which in each case have an axially oriented section 20, 22 and, again, radially oriented sections 21 and 24. It is thus possible to define an altered accommodating region for the radially inward end of the guide vanes 102 of a turbomachine.

In the two embodiments shown in FIGS. 1 to 3, the seal support 2 is in each case made from a fiber-reinforced plastic while the stripping lining 3, 13 is made from a silicone material, i.e. a polysiloxane material. The production can in this context take place such that for example the seal support 2, 12 is produced as what is termed a pre-preg, for example using a woven tube which is made of those fibers which the fiber-reinforced plastic is to comprise and which is then impregnated or provided with a corresponding plastic matrix which, however, is not yet cured. Only once a silicone molded body—also produced as a non-cured semi-finished product—has been arranged on the pre-preg seal support semi-finished product 2, 12 is curing carried out, for example at a temperature between 180° C. and 250° C., such that the respective materials of the seal support and of the stripping lining cure and cross-link not only individually, but also mutually, such that an arrangement of the stripping lining 3, 13 on the seal support 2, 12 having good adhesion is achieved.

Instead of producing both the seal support 2, 12 and the stripping lining 3, 13 separately as non-cured semi-finished products and then arranging them one on the other and curing them such that, when curing the semi-finished products, cross-linking between the seal support 2, 12 and the stripping lining 3, 13 takes place, it is also possible for a partial or complete combination of the shaping of the seal support 2, 12 and/or the stripping lining 3, 13 to take place together with the curing and cross-linking. Thus, for example, the stripping lining 3, 13 could already be present as a non-cured semi-finished product as a molded body, while the fiber-reinforced plastic is molded in a mold, for example by transfer molding or pultrusion, wherein at the same time the non-cured semi-finished product of the stripping lining 3, 13, which is also arranged in the mold, cross-links with the fiber-reinforced plastic of the seal support 3, 13. In addition to this partial shaping (in this case of the seal support 2, 12) simultaneously with the cross-linking with the stripping lining, it is also possible for a complete shaping of both the seal support 2, 12 and the stripping lining 3, 13 to take place with simultaneous cross-linking, if for example both materials are molded in parallel and at the same time as one another, for example by co-pultrusion.

It is thus possible to achieve a simple, reliable and durable binding of a stripping lining made of silicone to a fiber-reinforced plastic, without it being necessary to provide additional binding agents or adhesives between the seal support and the stripping lining. The laboriousness of production can thus be reduced.

A seal arrangement produced in this manner may, if necessary, be mechanically reworked, for example in order to remove burrs or the like.

Although the present invention has been described in detail with reference to the exemplary embodiments, it will be obvious to one skilled in the art that the invention is not restricted to these exemplary embodiments, rather that modifications are possible in that individual features can be omitted or differing combinations of features can be realized, so long as the scope for protection of the appended claims is not departed from. In particular, the disclosure of the present invention incorporates all combinations of the individual features presented.

What is claimed is:

1. A process for the production of a seal arrangement for a turbomachine, wherein the seal arrangement comprises (i) a seal support comprising a fiber-reinforced plastic and (ii) a stripping lining which is arranged on the seal support and comprises polysiloxane, and wherein the process comprises providing the seal support and the stripping lining in a non-cured state and arranging them in direct contact with one another in accordance with a configuration of the seal arrangement, and subsequently subjecting (i) and (ii) to a common curing process such that fiber-reinforced plastic and polysiloxane cross-link chemically with one another.

2. The process of claim 1, wherein fibers of the fiber-reinforced plastic comprise one or more of carbon fibers, glass fibers, aramid fibers, polyester fibers, polyvinyl acetate fibers, polypropylene fibers, polyethylene fibers.

3. The process of claim 1, wherein a matrix material of the fiber-reinforced plastic is a thermoset or a thermoplastic.

4. The process of claim 3, wherein the matrix material of the fiber-reinforced plastic comprises one or more of a polyimide resin, a phenol resin, a vinyl ester resin, an epoxy resin.

5. The process of claim 1, wherein the process further comprises molding seal support and stripping lining together in a mold to afford a non-cured semi-finished product.

6. The process of claim 1, wherein the seal support is produced by transfer molding, pultrusion, a resin injection method or a pre-preg method.

7. The process of claim 1, wherein the seal support and/or the stripping lining are produced as non-cured semi-finished products, as molded bodies.

8. The process of claim 1, wherein forming of the seal support and/or of the stripping lining and cross-linking with the stripping lining are carried out in one process step.

9. The process of claim 1, wherein common curing of the seal support and the stripping lining is carried out at temperatures in a range of from 120° C. to 250° C.

10. The process of claim 8, wherein common curing of the seal support and the stripping lining is carried out at temperatures in a range of from 120° C. to 250° C.

11. A seal arrangement for a turbomachine, wherein the seal arrangement comprises (i) a seal support comprising a fiber-reinforced plastic and (ii) a stripping lining arranged on the seal support and comprising polysiloxane, the polysiloxane being chemically cross-linked directly with the fiber-reinforced plastic.

12. The seal arrangement of claim 11, wherein the seal arrangement is at least part of an inner ring of a stator.

13. The seal arrangement of claim 11, wherein the seal support is formed as a ring or part of a ring and has, in cross section transverse to a circumferential direction of an annular structure, a U-shaped basic shape comprising a base which runs in a circumferential direction and webs which are arranged laterally at axial ends of the base and run radially and in the circumferential direction.

14. The seal arrangement of claim 13, wherein at the base the stripping lining is arranged over the full area over an entire extent of the seal support in axial direction and circumferential direction.

15. The seal arrangement of claim 13, wherein the radially oriented webs have, at ends thereof facing away from the base, angle elements having axially and radially oriented sections or axially oriented end strips, the axially oriented sections enclosing, with the radially oriented webs, an annular cavity of rectangular cross section.

16. A turbomachine, wherein the turbomachine comprises the seal arrangement of claim 1, which seal arrangement is arranged in a transition region between a rotor and a stator.

17. The turbomachine of claim 16, wherein the turbomachine is a static gas turbine or aircraft engine.

18. The turbomachine of claim 16, wherein the fibers of the fiber-reinforced plastic are arranged in the seal arrangement such that the fibers enclose, relative to an axis of rotation of the turbomachine or a direction parallel thereto, an acute angle of &el % 30° to 90°.

19. The turbomachine of claim 18, wherein the fibers enclose an acute angle of from 45° to 90°.

20. The turbomachine of claim 18, wherein the fibers enclose an acute angle of from 60° to 90°.

* * * * *